(12) United States Patent
Stehle

(10) Patent No.: US 9,637,092 B2
(45) Date of Patent: May 2, 2017

(54) BACK-PRESSURE VALVE

(75) Inventor: Michael Stehle, Überlingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 268 days.

(21) Appl. No.: 13/885,320

(22) PCT Filed: Nov. 15, 2011

(86) PCT No.: PCT/EP2011/005743
§ 371 (c)(1),
(2), (4) Date: Dec. 14, 2013

(87) PCT Pub. No.: WO2012/065715
PCT Pub. Date: May 24, 2012

(65) Prior Publication Data
US 2014/0083563 A1 Mar. 27, 2014

(30) Foreign Application Priority Data

Nov. 15, 2010 (DE) .................. 10 2010 060 561
Mar. 28, 2011 (DE) .................. 10 2011 001 603

(51) Int. Cl.
| B65B 31/00 | (2006.01) |
| B60S 5/04 | (2006.01) |
| B29C 73/16 | (2006.01) |
| F16K 15/20 | (2006.01) |
| B29L 30/00 | (2006.01) |

(52) U.S. Cl.
CPC .............. B60S 5/04 (2013.01); B29C 73/166 (2013.01); F16K 15/20 (2013.01); *B29L 2030/00* (2013.01); *Y10T 137/7903* (2015.04)

(58) Field of Classification Search
CPC ...... B29C 73/166; B60S 5/04; B29L 2030/00; F16K 15/20
USPC ........... 141/38, 67, 100, 105, 114, 231, 313; 81/15.6
See application file for complete search history.

(56) References Cited

U.S. PATENT DOCUMENTS

| 5,518,026 A | 5/1996 | Benjey | |
| 7,748,295 B2* | 7/2010 | Hong | B29C 73/166 137/223 |
| 7,798,183 B2* | 9/2010 | Cegelski | B29C 73/166 141/38 |
| 8,020,588 B2* | 9/2011 | Wang | B29C 73/166 141/100 |
| 8,297,321 B2* | 10/2012 | Chou | B29C 73/166 141/38 |

(Continued)

FOREIGN PATENT DOCUMENTS

| CN | 1498321 A | 5/2004 |
| DE | 202004009114 U1 | 12/2004 |

(Continued)

OTHER PUBLICATIONS

International Search Report corresponding to PCT/EP2011/005743, dated Apr. 13, 2012.

*Primary Examiner* — Jason K Niesz
(74) *Attorney, Agent, or Firm* — Hauptman Ham, LLP

(57) ABSTRACT

In a device for discharging tire sealing agent from a container which can be connected to a pressure source and to a tire valve, a check valve is provided in the connection to the pressure source and/or in the connection to the tire valve.

26 Claims, 5 Drawing Sheets

(56) References Cited

U.S. PATENT DOCUMENTS

| | | | | |
|---|---|---|---|---|
| 8,336,581 | B2* | 12/2012 | Lolli | B29C 73/166 141/38 |
| 2006/0175357 | A1 | 8/2006 | Hammond | |
| 2007/0181209 | A1* | 8/2007 | Stehle | B29C 73/166 141/38 |
| 2008/0098855 | A1 | 5/2008 | Cegelski et al. | |
| 2008/0202632 | A1* | 8/2008 | Hung | B29C 73/166 141/38 |
| 2009/0107578 | A1* | 4/2009 | Trachtenberg | B05B 9/0805 141/5 |
| 2010/0329911 | A1 | 12/2010 | Borst et al. | |
| 2011/0041951 | A1* | 2/2011 | Lolli | B29C 73/166 141/38 |
| 2013/0048146 | A1* | 2/2013 | Eckhardt | B29C 73/166 141/38 |

FOREIGN PATENT DOCUMENTS

| | | |
|---|---|---|
| DE | 202006001994 U1 | 6/2007 |
| DE | 202008012804 U1 | 2/2009 |
| DE | 102008006686 A1 | 7/2009 |
| EP | 2399728 A1 | 12/2011 |
| WO | 2010078626 A1 | 7/2010 |

* cited by examiner

BACK-PRESSURE VALVE

RELATED APPLICATIONS

The present application is National Phase of International Application Number PCT/EP2011/005743, filed Nov. 15, 2011, and claims priority from, German Application Number 10 2010 060 561.1, filed Nov. 15, 2010, and German Application Number 10 2011 001 603.1, filed Mar. 28, 2011.

The invention relates to a device for discharging tire sealing agent from a container which can be connected firstly to a pressure source and secondly to a tire valve.

PRIOR ART

Devices of this type are known in a wide variety of forms and embodiments and are commercially available. For example, DE 20 2006 001 994 U1 describes a device of this type, in which any desired pressure source can be connected to the check valve and, if an overpressure is generated in the container, a removal opening can be opened in order to discharge tire sealing agent from the container into a tire.

OBJECT

It is an object of the present invention to configure a device of the abovementioned type in such a way that a backflow of tire sealing agent and/or air does not occur.

Achieving the Object

The fact that a shut-off valve is provided in the connection to the pressure source and/or in the connection to the tire valve leads to the object being achieved.

The basic concept of the present invention comprises firstly that a single-part or multiple-part flap is provided at any desired point in the connection, which flap is moved by a pressure medium, in particular by air, into the open position and, in the event of a reduction in the pressure medium, is moved into the closed position either automatically or under the pressure of the tire sealing agent. It can be sufficient here if, for example, a flap of this type is molded into the connection.

However, the shut-off valve, as non-return valve, is preferably configured in such a way that it can be inserted without difficulties into the connection, as a result of which tire sealing agent systems which already exist can also be equipped with said non-return valve. It goes without saying, however, that the concept of the invention also includes the fact that said non-return valve is an integrated constituent part of the connection or of a separate check valve.

In one preferred exemplary embodiment, the non-return valve is of very simple configuration, by a sleeve being connected flexibly to a flap at at least one end. Said flap is configured in such a way that it closes the sleeve at one end. However, it can also be of multiple-part configuration.

However, the present invention includes not only the abovementioned entire device, but rather also separately a check valve which is configured in this way or even also separately a non-return valve of corresponding configuration.

In a further exemplary embodiment of the invention, the check valve can go back to concepts which are known from bicycle valves. In this case, a channel for compressed air and/or tire sealing agent is adjoined by a hollow nipple which is closed at the front by a plug. For this purpose, however, it has at least one transverse bore which is closed, however, by a flexible sleeve which is pulled onto the hollow nipple. That is to say, compressed air does not pass into the container with tire sealing agent until the compressed air is so powerful that it overcomes the closing pressure of the flexible sleeve, in particular rubber sleeve. Secondly, a backflow of tire sealing agent into the hollow nipple or an axial channel of the hollow nipple is avoided effectively.

An optional concept is also to additionally insert a further valve insert into the connection to the compressed air source. For example, a known bicycle, or motor-vehicle, valve can also be used here. A double safeguard against backflow takes place as a result.

DESCRIPTION OF THE FIGURES

Further advantages, features and details of the invention result from the following description of preferred exemplary embodiments and using the drawing, in which.

Concerning the actual device according to the invention for discharging tire sealing agent from a container, reference is made, in particular, to DE 20 2006 001 994 U1 and the latter is also made part of the contents of the present application.

Figure 1:
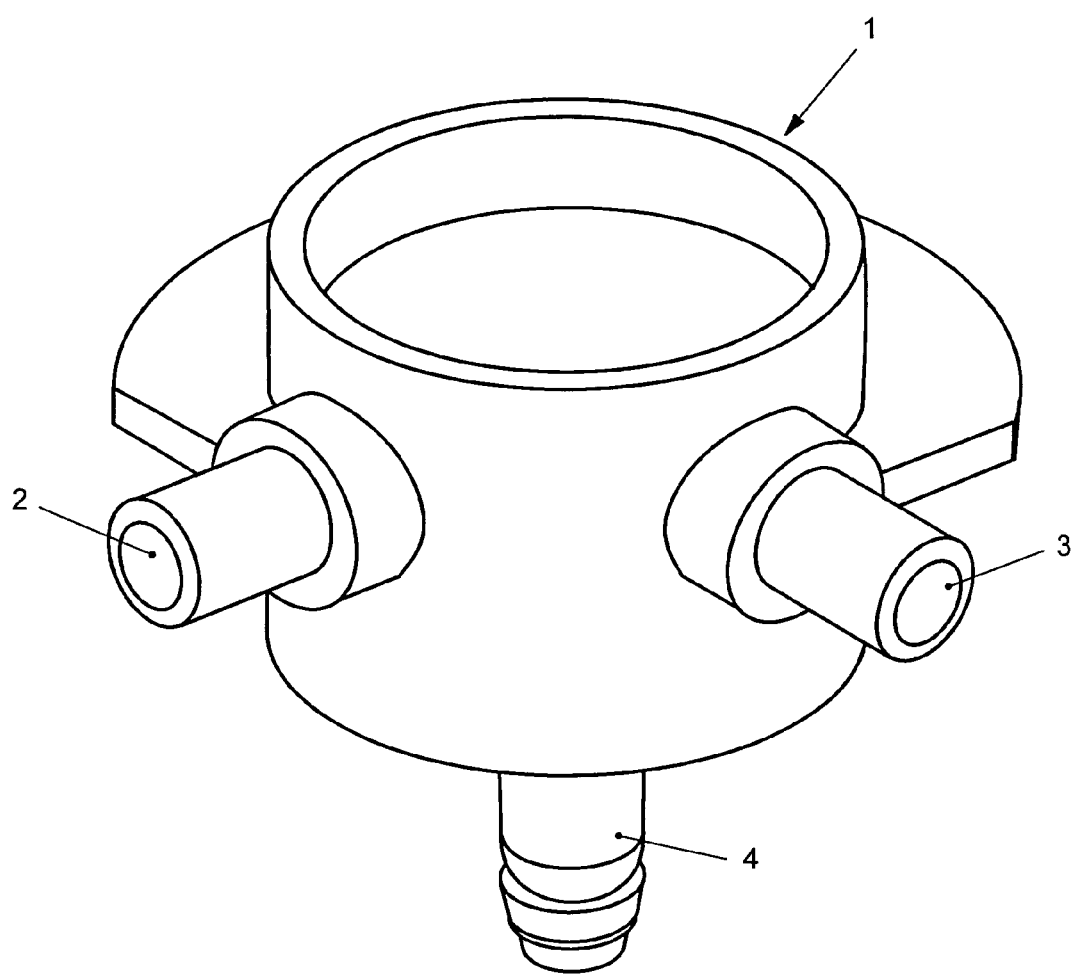
FIG. 1 shows a perspective view of a check valve according to the invention.
Figure 3:
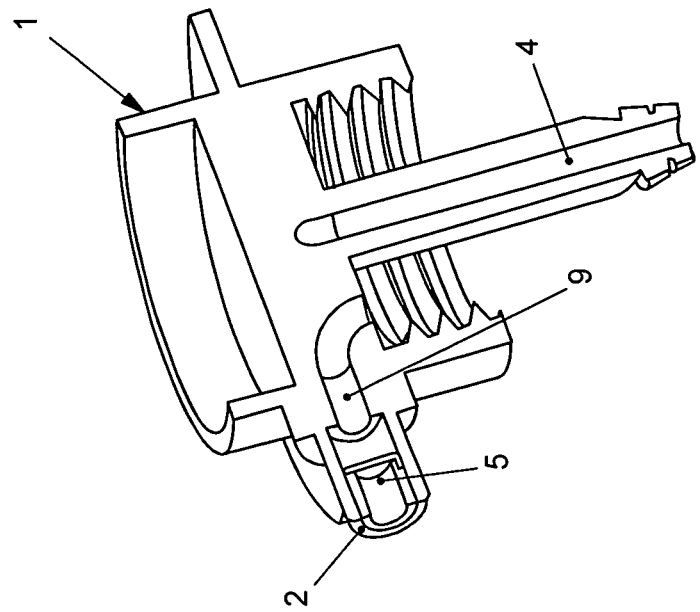
FIG. 3 shows a perspective sectional view of the check valve according to FIG. 1 in a further use position.
Figure 2:
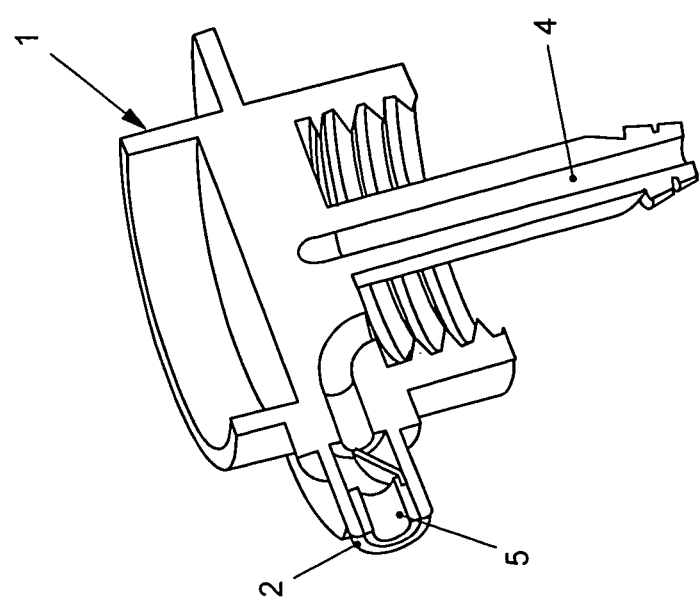
FIG. 2 shows a perspective sectional view of the check valve according to FIG. 1.

In DE 20 2006 001 994 U1, a check valve 1 is used, as is shown, in particular, in FIG. 1 of the present application. Said closure element has an inlet 2 for compressed air and an outlet 3 for the tire sealing agent. Compressed air is pressed via the inlet 2 into a container (not shown in greater detail), which container causes the tire sealing agent to rise through a riser pipe 4 and to be discharged from the outlet 3, a hose piece which can be connected to a valve of a tire being connected to the outlet 3.

Figure 5:
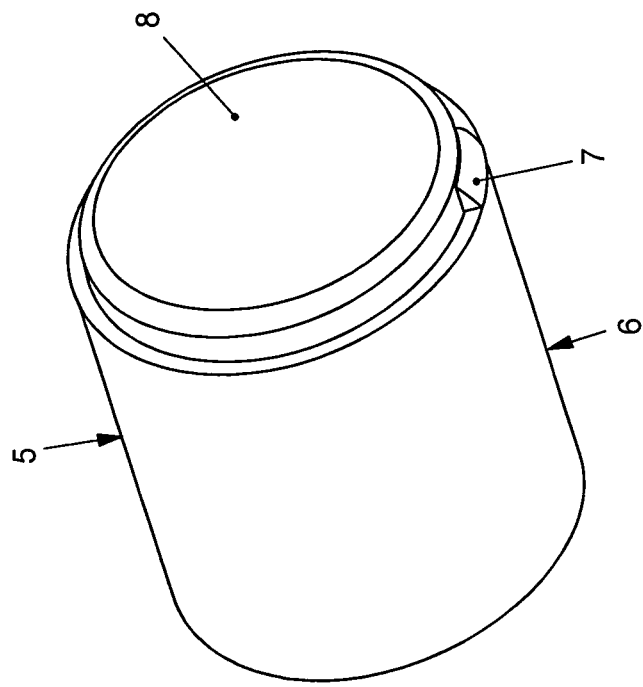
FIG. 5 shows a perspective view of a non-return valve according to the invention in the closed position.
Figure 4:
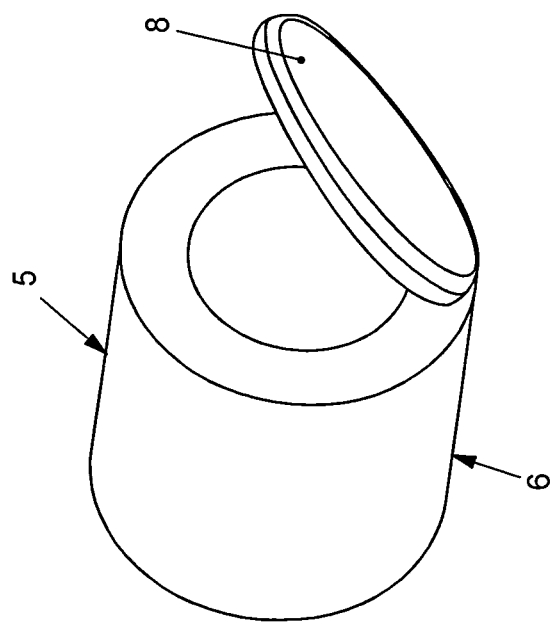
FIG. 4 shows a perspective view of a non-return valve according to the invention in the open position.

According to the invention, a shut-off valve, and a non-return valve 5 here, is inserted in the inlet 2, as is shown in greater detail in FIGS. 4 and 5. Said non-return valve 5 comprises a sleeve 6 which is connected to a flap 8 via a flexible joint 7.

The method of operation of the present invention is as follows:

The non-return valve 5 is configured as a separate element and is pushed into the inlet 2 of the check valve 1, the flap 8 being situated in the interior. In this way, check valves 1 which are already present can also be retrofitted with said non-return valve 5.

If compressed air is then introduced through the inlet 2 and the channel 9 into the check valve 1, the flap 8 opens and releases the path. The tire sealing agent in the container (not shown in greater detail) is pressurized and flows through the riser pipe 4 and the outlet 3 in the direction of the tire.

If the pressure is canceled by the inlet 2, a backflow of air and/or tire sealing agent could occur through the channel 9 in the direction of a compressor. This is undesirable, for which reason the flap 8 is provided which then closes the sleeve 6 or its passage.

Figure 6:
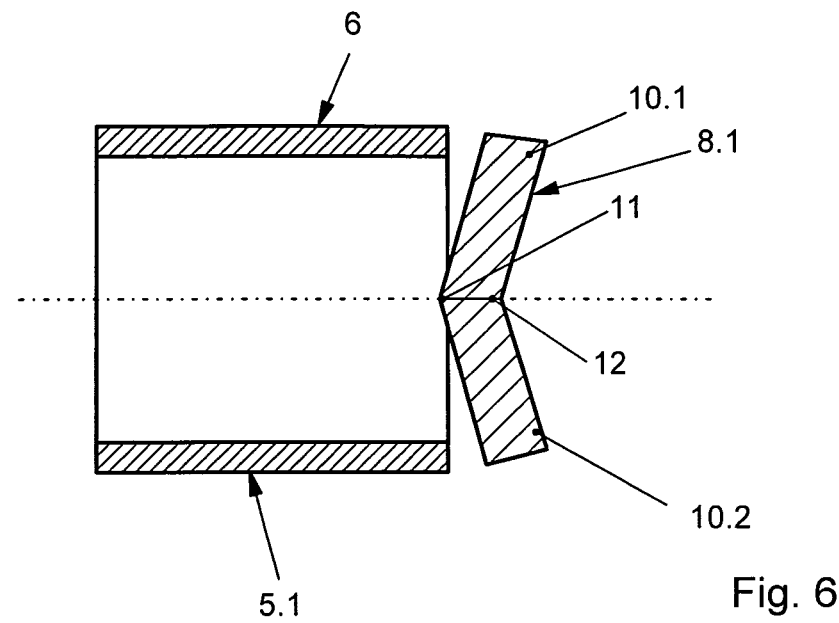
FIG. 6 shows a longitudinal section through a further exemplary embodiment of a non-return valve according to the invention in the open position.
Figure 7:
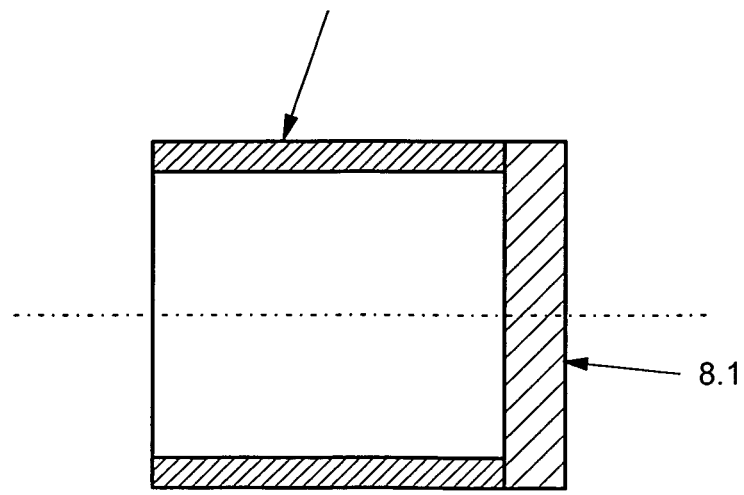
FIG. 7 shows a longitudinal section through the non-return valve according to FIG. 6 in the closed position.

In a further exemplary embodiment of a non-return valve 5.1 according to FIGS. 6 and 7, a flap 8.1 is formed from two half flaps 10.1 and 10.2. The latter have articulation points 11 with the sleeve 6 which lie opposite one another, only one articulation point being shown here. Said embodiment has the advantage that, when air is introduced into the container, either only one half flap 10.1 or 10.2 is opened or else both, a buckling line 12 then occurring which causes the half flaps 10.1 and 10.2 to move automatically into the closed position again when the compressed air decreases.

Figure 8:
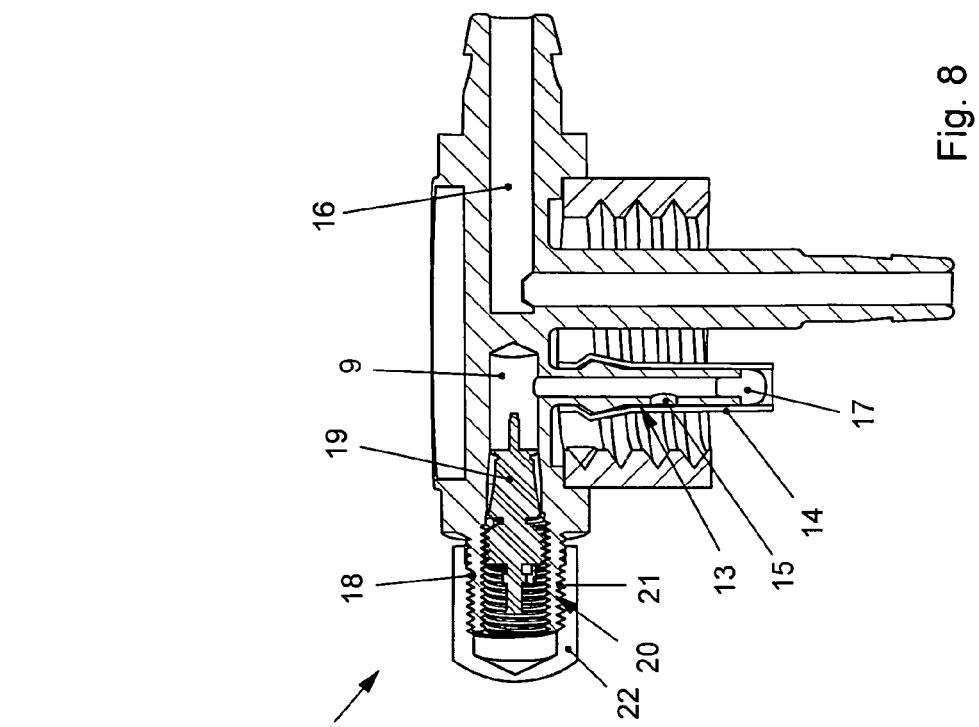
FIG. 8 shows a cross section through a further exemplary embodiment of a check valve according to the invention.
Figure 9:
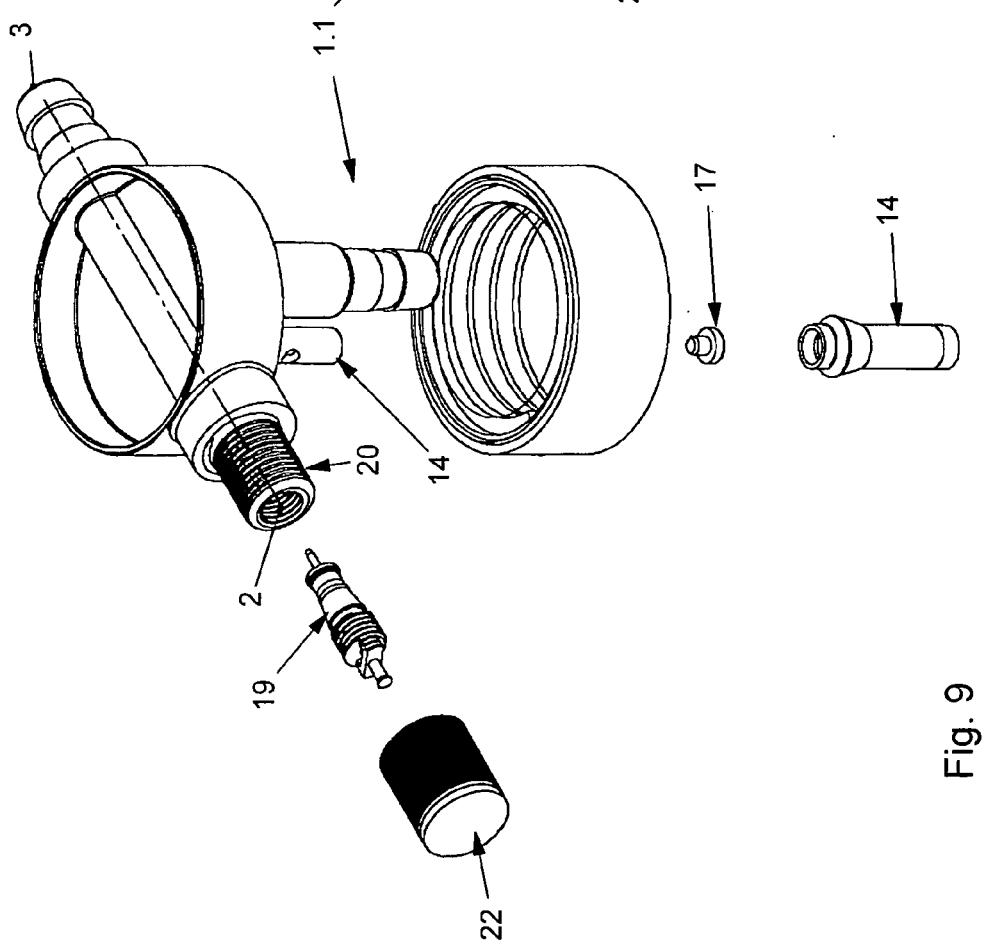
FIG. 9 shows the check valve according to FIG. 8 in an exploded illustration.

According to FIGS. 8 and 9, the check valve is modeled on a bicycle valve. To this end, the channel 9 is adjoined by a hollow nipple 13, onto which a flexible sleeve 14 is pushed. In the use position, said flexible sleeve 14 also covers a transverse bore 15 which is open toward an axial channel 16. The hollow nipple 13 is closed at the bottom by a plug 17.

Furthermore, a thread 18 is formed into the channel 9, into which thread 18 a further valve insert 19 is screwed. This can be configured, for example, similarly to the known bicycle, or motor-vehicle, valves.

The thread 18 is situated in a threaded section 20 which also has an external thread 21, onto which a closure cap 22 is screwed.

In said shown exemplary embodiment, it is also shown that the inlet 2 for compressed air and the outlet 3 for tire sealing agent do not have to be arranged offset by 90° with respect to one another, but rather that an axial arrangement is possible.

LIST OF DESIGNATIONS

1 Check valve
2 Inlet
3 Outlet
4 Riser pipe
5 Non-return valve
6 Sleeve
7 Joint
8 Flap
9 Channel
10 Half-flap
11 Articulation point
12 Buckling line
13 Hollow nipple
14 Flexible sleeve
15 Transverse bore
16 Axial channel

The invention claimed is:

1. A device, comprising:
a valve apparatus configured for discharging tire sealing agent from a container, the valve apparatus including a first connector configured to connect to a pressure source and a second connection configured to connect to a tire valve, wherein a shut-off valve is provided in at least one of the first connector or the second connector, wherein one of:
the shut-off valve, as a non-return valve, is a sleeve which is connected flexibly to a flap at least at one end; or
the shut-off valve is a hollow nipple which is assigned to the connection, has at least one transverse bore, and onto which a flexible sleeve is pulled.

2. The device as claimed in claim 1, wherein a single-part or multiple-part flap is provided in the connection, which flap can be moved by a pressure medium into the open position and, in the event of a reduction in the pressure medium, can be moved into the closed position either automatically or under the pressure of tire sealing agent.

3. The device as claimed in claim 1, wherein the shut-off valve, is the non-return valve, and is the sleeve which is connected flexibly to the flap at least at one end.

4. The device as claimed in claim 3, wherein the flap is configured in such a way that it closes the sleeve at one end.

5. The device as claimed in claim 3, wherein the flap is split in two and has articulation points with the sleeve which lie opposite one another.

6. The device as claimed in claim 1, wherein the shut-off valve is the hollow nipple which is assigned to the connection, has at least one transverse bore, and onto which the flexible sleeve is pulled.

7. The device as claimed in claim 6, wherein a further valve insert (bicycle or motor-vehicle valve) is connected upstream of the hollow nipple in the connection.

8. An assembly, comprising:
a check valve having at least one channel for introducing air into a container and/or a channel for discharging a tire sealing agent from a container, wherein a shut-off valve is provided in one channel or in both channels.

9. The check valve as claimed in claim 8, wherein the shut-off valve, as non-return valve, is a sleeve which is connected flexibly to a flap at least at one end.

10. The check valve as claimed in claim 9, wherein the flap is configured in such a way that it closes the sleeve at one end.

11. The check valve as claimed in claim 9, wherein the flap is of multiple-part configuration.

12. The check valve as claimed in claim 8, wherein the shut-off valve is a hollow nipple which is assigned to the connection, has at least one transverse bore, and onto which a flexible sleeve is pulled.

13. The check valve as claimed in claim 12, wherein a further valve insert (bicycle or motor-vehicle valve) is connected upstream of the hollow nipple in the connection.

14. An assembly, comprising:
a non-return valve configured for insertion into a check valve, which check valve has at least one channel for introducing a pressure medium into a container and/or at least one channel for discharging a tire sealing agent from a container, wherein the non-return valve is a sleeve which is connected flexibly to a flap at least at one end.

15. The non-return valve as claimed in claim 14, wherein the flap is configured in such a way that it closes the sleeve at one end.

16. The non-return valve as claimed in claim 14, wherein the flap is of multiple-part configuration.

17. An apparatus, comprising:
a device configured to discharge tire sealing agent from a container attachable to the device, wherein
the device includes a first connector and a second connector, the first connector being configured to be connected to a source of pressure and the second connector being configured to be connected to a tire valve, and
the device includes a shut-off valve provided in at least one of the first connector or the second connector, the shut-off valve including a flap configured to block fluid flow from a first side of the shut-off valve to a second side of the shut-off valve.

18. The apparatus of claim 17, wherein:
the first connector and the second connector include hollow passages therein configured such that fluid flows therethrough during operation of the apparatus, wherein the shut-off valve is provided in at least one of the respective hollow passages.

19. The apparatus of claim 18, wherein:
the shut-off valve comprises a sleeve, wherein the flap is affixed to the sleeve, wherein the sleeve includes a hollow passage therein configured such that the fluid that flows through the hollow passages of the first and second connector during operation of the apparatus also flows through the sleeve during operation of the apparatus.

20. The assembly of claim 14, further comprising:
the check valve, wherein the check valve has the least one channel for introducing the pressure medium into the container and/or at least one channel for discharging the tire sealing agent from the container, wherein
the non-return valve is located in the check valve.

21. The device as claimed in claim 1, further comprising:
the container, wherein the tire sealing agent is contained in the container.

22. The apparatus of claim 17, further comprising:
the container, wherein the tire sealing agent is contained in the container.

23. The device as claimed in claim 1, further comprising:
the container, wherein the tire sealing agent is contained in the container, and wherein the shut-off valve is located outside the container.

24. The device as claimed in claim 1, wherein the valve apparatus includes a threaded portion configured to be screwed onto the container, wherein a fluid passage extends from a space bounded in part by the threaded portion to the second connector, and wherein the shut-off valve is located downstream with respect to the fluid passage from the space bounded in part by the threaded portion.

25. The device as claimed in claim 1, wherein the valve apparatus includes a threaded portion configured to be screwed onto the container, wherein the shut-off valve is located on an outside of a space established by the threaded portion.

26. The device as claimed in claim 1, wherein the valve apparatus includes a monolithic portion that comprises the first connector and the second connector.

* * * * *